United States Patent [19]

Miura et al.

[11] Patent Number: 5,385,779
[45] Date of Patent: Jan. 31, 1995

[54] MAGNETIC RECORDING MEDIUM

[75] Inventors: Toshihiko Miura; Hiroo Inaba, both of Kanagawa, Japan

[73] Assignee: Fuji Photo Film Co., Ltd., Kanagawa, Japan

[21] Appl. No.: 102,834

[22] Filed: Aug. 6, 1993

[30] Foreign Application Priority Data

Aug. 12, 1992 [JP] Japan ................................. 4-214998

[51] Int. Cl.$^6$ ............................................. G11B 5/00
[52] U.S. Cl. .................... 428/323; 428/328; 428/694 BN; 428/694 BA; 428/694 BM; 428/900
[58] Field of Search .............. 428/323, 328, 694 BN, 428/694 BA, 694 BM, 900

[56] References Cited

U.S. PATENT DOCUMENTS

| | | | |
|---|---|---|---|
| 4,842,917 | 6/1989 | Ohno et al. | 428/141 |
| 5,035,948 | 7/1991 | Saito et al. | 428/329 |
| 5,094,908 | 3/1992 | Ryoke et al. | 428/323 |
| 5,252,392 | 10/1993 | Goto et al. | 428/336 |

*Primary Examiner*—Stevan A. Resan
*Attorney, Agent, or Firm*—Sughrue, Mion, Zinn, Macpeak & Seas

[57] ABSTRACT

A magnetic recording medium is disclosed, comprising a nonmagnetic support having thereon a lower nonmagnetic layer comprising nonmagnetic particles dispersed in a binder and further having on the lower layer an upper magnetic layer comprising ferromagnetic metal particles comprising alpha iron crystals dispersed in a binder, wherein said upper magnetic layer has diffraction dots attributable to the ferromagnetic metal particles present on the magnetic layer surface when analyzed by reflection high-energy electron diffraction, the number of said diffraction dots is from 5 to 15 when counted in a 100° range on a circular arc of diffraction dots caused by diffraction on a (211) plane of said ferromagnetic metal particles present on the magnetic layer surface.

3 Claims, No Drawings

MAGNETIC RECORDING MEDIUM

FIELD OF THE INVENTION

The present invention relates to a magnetic recording medium, more particularly to a coated-type magnetic recording medium which has high density.

BACKGROUND OF THE INVENTION

Magnetic recording media are widely used as audio tapes, video tapes, computer tapes, floppy disks, etc. Magnetic recording media have attained higher densities and shorter recording wavelengths, and in addition to the analogue recording mode, the digital mode has also been studied. In order to meet the higher-density requirement, a magnetic recording medium employing a thin metal layer as a magnetic layer has been proposed. This metal thin film type magnetic recording medium is inferior in production efficiency and in reliability for practical use (such as corrosion resistance), to so-called coated-type magnetic recording media produced by coating on a support ferromagnetic particles dispersed in a binder. However, the coated-type magnetic recording medium shows Door electromagnetic characteristics because the coated-type magnetic recording medium has lower packing density of ferromagnetic particles than the metal thin film type magnetic recording medium. The coated type magnetic recording media comprising a nonmagnetic support having thereon a magnetic layer containing particles of ferromagnetic iron oxide, Co-modified ferromagnetic iron oxide, $CrO_2$, a ferromagnetic alloy, or the like dispersed in a binder is widely used.

The electromagnetic characteristics of coated-type magnetic recording medium can be improved by improving the magnetic properties of the ferromagnetic particles or by smoothing the surface. For attaining these improvements, various methods have been proposed. However none of these proposals is sufficient to attain higher density.

Along with the desire for higher densities, there is a recent trend toward recording wavelength reduction. As a result, the problems of self-demagnetization loss, during recording and thickness loss during reproduction, both of which lead to reduced output, have become severe when the magnetic layer has a large thickness.

Although thickness reduction in magnetic layers has been attempted in order to eliminate the above problems, a magnetic layer thickness of about 2 $\mu$m or less is disadvantageous in that the surface of such a thin magnetic layer is apt to be affected by the nonmagnetic support, resulting in impaired electromagnetic characteristics and worsened drop out (DO). This influence of the support surface roughness can be eliminated by first forming a thick, nonmagnetic undercoating layer on the support surface and then forming thereon a magnetic layer as an upper layer, as described in JP-A-57-198536. (The term "JP-A" as used herein means an "unexamined published Japanese patent application".) This method, however, has problems in that no improvement is attained in head wear or durability. This may be attributable to the fact that the conventional, nonmagnetic lower layer employs a thermosetting resin as a binder and hence the magnetic layer is brought into contact with a head or with other parts without a buffer due to the cured lower layer, and the magnetic recording medium having such a lower layer has slightly insufficient flexibility.

Although the above problem may be eliminated by using a non-curing resin as the binder for the lower layer, the use of a non-curing resin binder poses problems, for example, the surface roughness of the magnetic layer are impaired which results in poor electromagnetic characteristics. This is because in the conventional method in which a magnetic layer as an upper layer is applied after a lower layer has been applied and dried, the lower layer swells due to the organic solvent contained in the coating solution for forming the upper layer and affects the upper layer-forming coating solution by, for example, causing a turbulent flow therein. A reduction in magnetic layer thickness may be attained by reducing spread rate or by lowering the concentration of a magnetic coating solution by adding a large amount of solvent thereto.

In the case of the former reducing means, due to the reduction in spread rate, the applied coating solution begins to dry before it has sufficiently leveled, thus creating a problem of coating defects remaining in the resulting magnetic layer, such as streaks or a stamp pattern. Consequently, a considerably poor yield results. In the case of the latter reducing means, the low concentration of the magnetic coating solution exerts various negative effects. For example, the coating film formed has a large amount of voids, so that a sufficiently high packing density of magnetic particles cannot be obtained and the coating film has insufficient strength. These serious problems lead to poor yield in the technique disclosed in JP-A-62-154225.

As one method for eliminating these problems, a magnetic recording medium produced by a simultaneous multiple layered coating method as described in JP-A-63-191315 and JP-A-63-187418 has been proposed. By employing the simultaneous multiple layered coating method in which a nonmagnetic layer is formed as a lower layer and an upper magnetic layer containing ferromagnetic particles is formed thereon while the lower layer is in a wet state, a magnetic recording medium can be produced which is free from coating defects, is excellent in production efficiency, and has been improved in electromagnetic characteristics such as reproduction output and C/N and in running durability.

However, even with the above-described coating method, the following problem remains unsolved.

In recent years, magnetic recording media are required to have an extremely smooth surface in order to reduce the spacing loss caused by a gap between the magnetic recording medium and a magnetic head to obtain a higher density and higher output. For attaining this, it is becoming more necessary that the nonmagnetic lower layer, which is not directly exposed, also should have as good dispersion state as possible, and the surface resulting from simultaneous multiple layered coating should be smooth. It may be thought that in the above-described simultaneous multiple layered coating technique, the surface roughness of the magnetic layer can be improved by reducing the size of the particles employed in the lower layer to ensure the smooth surface of the lower nonmagnetic layer. However, use of such fine particles poses a problem in that these particles are apt to aggregate to impair the surface roughness of the lower layer rather than to improve it, and this in turn causes the magnetic layer to have poor surface properties.

The problem is that even when an improvement in electromagnetic characteristics is attempted by further reducing the thickness of a magnetic layer, the interface between the magnetic layer and the lower layer is difficult to control because of the poor dispersibility of the particles in the lower layer and, as a result, the interface becomes rough, and a uniformly smooth magnetic layer cannot be obtained. That is, as a result of a reduction in magnetic layer thickness, the dispersibility in the lower nonmagnetic layer has a greater effect on the surface roughness of the magnetic layer formed by simultaneous multiple layered coating. However, any of the conventional techniques cannot properly eliminate these difficulties.

Thus, although it is necessary to further improve the dispersibility of nonmagnetic particles, a proper means has not been found.

Another problem is that when a magnetic layer has too smooth of a surface, sufficient running durability cannot be obtained because repeated running operations cause sticking or head clogging due to the increased coefficient of friction.

In a well known technique for overcoming this problem in coated-type magnetic recording media, head-cleaning ability is enhanced by increasing the amount of an abrasive agent, or running properties are improved by increasing the amount of carbon black or by using a carbon black having larger particle sizes. Use of these methods, however, results in a lower packing density of ferromagnetic particles and hence adversely influences the attainment of higher density.

As a way to impart good running properties to an especially smooth magnetic layer, a technique of forming protrusions on the magnetic layer surface is described in JP-A-2-81315 and JP-A-2-113423. This method disadvantageous in that it is difficult to diminish noise and to attain both a high level of electromagnetic characteristics and running stability.

Further, a technique is disclosed in JP-A-63-241720 which uses a combination of $\alpha$-alumina as an abrasive agent and carbon black in order to improve running properties, surface electric resistance, and mar resistance (i.e., wear resistance). However, the magnetic recording media produced by this technique either have good electromagnetic characteristics with insufficient running properties, or have good running properties with insufficient electromagnetic characteristics. Thus, the above technique has been unable to stably attain both electromagnetic characteristics and running durability without fail. Besides the above reference, the technique of using a combination of an abrasive agent and carbon black is also described in JP-A-2-105324, JP-A-61-194634, JP-A-62-246134, and others. However, both electromagnetic characteristics and running durability have not been stably attained by any of these methods.

It is also known that calendering is conducted under various conditions in order to smooth the surface of a magnetic layer. For example, the following techniques are known: JP-B-52-17404 discloses a magnetic recording medium production process in which surface treatment is conducted at a linear pressure of 50 to 500 kg/cm$^2$ using a high-hardness elastomeric roll made of, e.g., urethane rubber, and a metal roll heated at 40 to 200° C. (the term "JP-B" as used herein means an "examined Japanese patent publication"); and JP-A-61-24022 discloses a process for producing a magnetic recording medium having a two-layer structure which comprises calendering the first magnetic layer under conditions of a linear pressure of 350 kg/cm$^2$ or more and a roll temperature of 80° C. or higher and calendering the second magnetic layer under conditions of a linear pressure of 250 kg/cm or more and a roll temperature of 60° C. or higher. Besides these, the techniques disclosed in JP-A-64-76532, JP-A-1-315025, and others are known. However, the magnetic recording media produced by these techniques either have good electromagnetic characteristics with insufficient running properties, or have good running properties with insufficient electromagnetic characteristics. Thus, the above techniques have been unable to stably attain both electromagnetic characteristics and running durability without fail.

SUMMARY OF THE INVENTION

An object of the present invention is to provide the magnetic recording medium having both of excellent electromagnetic characteristics and excellent running durability.

In accordance with the present invention, intensive studies were conducted on the smoothed surface of magnetic layers and on the relationship between the surface properties and running durability, in order to attain both electromagnetic characteristics and running durability which attainment is an object of the present invention. As a result, it has been found that magnetic layers, even though having the same average roughness ($R_a$), differ in the appearance of diffraction dots attributable to ferromagnetic metal particles when the magnetic layer surfaces are analyzed by reflection high-energy electron diffraction (RHEED), and that this difference has a correlation with running durability. The present invention has been completed based on these findings.

The above-described object of the present invention can be accomplished with a magnetic recording medium comprising a nonmagnetic support having thereon an least one magnetic layer comprising ferromagnetic metal particles dispersed in a binder, wherein said magnetic layer has diffraction dots attributable to the ferromagnetic metal particles present on the magnetic layer surface when analyzed by reflection high-energy electron diffraction, the number of said diffraction dots is from 5 to 15 when counted in a 100° range on a circular arc of diffraction dots caused by diffraction on the (211) plane of said ferromagnetic metal particles present on the magnetic layer surface.

The object of the present invention can also be accomplished with a magnetic recording medium comprising a nonmagnetic support having thereon a lower layer which is either a lower nonmagnetic layer comprising nonmagnetic particles dispersed in a binder or a lower magnetic layer comprising ferromagnetic particles dispersed in a binder, and further having on the lower layer an upper magnetic layer comprising ferromagnetic metal particles dispersed in a binder, wherein said upper magnetic layer has diffraction dots attributable to the ferromagnetic metal particles present on the magnetic layer surface when analyzed by reflection high-energy electron diffraction, the number of said diffraction dots is from 5 to 15 when counted in a 100° range on a circular arc of diffraction dots caused by diffraction on a (211) plane of said ferromagnetic metal particles present on the magnetic layer surface.

DETAILED DESCRIPTION OF THE INVENTION

For obtaining the magnetic recording media of the present invention, various techniques may be used. Examples thereof include:

(1) incorporating, in the magnetic layer, an abrasive agent having an average particle size of 0.05 to 0.3 μm and a carbon black having an average primary particle size of 0.005 to 0.1 μm (i.e., diameter of an equivalent circle for a measured area which is obtained by tracing and measuring a photograph (magnification: ×100,000) photographed using the transmission electron microscope on a digitizer tablet of the image analyzer (IBAS-1));

(2) forming the upper magnetic layer while the lower nonmagnetic layer or the lower magnetic layer applied on the nonmagnetic support is still in a wet state and calendering the resulting magnetic recording medium at a roll temperature of 50 to 110° C., a linear pressure of 200 to 400 kg/cm, and a speed of 50 to 350 m/min;

(3) using a polar group-containing binder thereby to enhance dispersibility in the magnetic coating solution;

(4) selecting a coating solvent, drying temperature, and other conditions to reduce the drying speed of the coating; and (5) improving the dispersibility of inorganic particles in the lower nonmagnetic layer thereby to facilitate the control of the interface and ensure the smooth surface of the magnetic layer.

By using these techniques alone or in combination in various ways, the number of diffraction dots can be varied. It is utterly remarkable that in accordance with the present invention, otherwise conventional magnetic layers containing ferromagnetic metal particles show diffraction dots in RHEED pattern and can be significantly improved by controlling the number of the dots to a specific value of from 5 to 15.

Although the present invention can be attained by employing any one of techniques (1) to (5) above or a combination of two or more, the important point is that the number of diffraction dots attributable to the ferromagnetic metal particles present on the magnetic layer surface should be controlled so as to be in the range of from 5 to 15 when counted in a 100° range on a circular arc of diffraction dots caused by diffraction on the (211) plane. Each of techniques (1) to (5) above has been conventionally known. However, since the importance of the control of diffraction dot number has not been known, unstable results have always been obtained in which some magnetic recording media are good in electromagnetic characteristics but insufficient in running properties and others are good in running properties but insufficient in electromagnetic characteristics. In contrast, in the present invention, it is possible to stably attain both electromagnetic characteristics and running durability without fail, by controlling the number of diffraction dots to a value of from 5 to 15. This effect is completely unexpected from any prior art technique.

That is, the present invention is characterized in that when the magnetic layer comprising ferromagnetic metal particles dispersed in a binder is analyzed by reflection high-energy electron diffraction (RHEED), the number of diffraction dots, i.e., the number of black spots, attributable to the ferromagnetic metal particles present on the magnetic layer surface is from 5 to 15. It has been found that by controlling the number of diffraction dots, a magnetic recording medium can be obtained which is extremely high in electromagnetic characteristics, particularly in 7 MHz output and C/N, and shows exceedingly good running durability.

Evaluation of the surface properties of a magnetic layer by RHEED has already been conducted for coated-type magnetic recording media employing ferromagnetic iron oxide particles, as described in U.S. Pat. No. 5,094,908 (corresponding to JP-A-3-62312) and JP-A-3-224123. With respect to coated-type magnetic recording media employing ferromagnetic metal particles, the same evaluation as that for the magnetic recording media employing iron oxide particles has not been conducted because the coated-type magnetic recording media employing ferromagnetic metal particles have smoother magnetic layer surfaces and smaller magnetic particle sizes, and hence the diffraction patterns therefor obtained by RHEED are in the form of a semicircular line.

As a result of a recent careful examination of RHEED diffraction patterns for the surfaces of metal particle-containing magnetic layers, it has been newly found that diffraction dots, or spots, are present in linear diffraction patterns.

A diffraction pattern obtained by RHEED contains circular arcs of diffraction dots in which arcs correspond to the (110) plane, (200) plane, and (211) plane, respectively, of the ferromagnetic metal particles, and black spots are observed along each line. The reason why a 100° range on the circular arc for the (211) plane was selected is that this range is convenient for counting the diffraction dots, i.e., black spots.

Although the particular state of the magnetic layer surface that is achieved by containing the number of these diffraction dots is not previously known, it is presumed that the smooth surface has minute protrusions as small as one magnetic particle or an aggregate of several magnetic particles, and these protrusions cause strong diffraction dots.

Such minute ferromagnetic metal particle protrusions on the magnetic layer which correspond to diffraction dots, or black spots, are too fine to affect the surface roughness ($R_a$). It has therefore been found that even though the value of apparent $R_a$ does not change, the number of diffraction dots, i.e., black spots, varies depending on the number of such protrusions each made up of one or several ferromagnetic metal particles, and this variation of that number considerably changes both electromagnetic characteristics and running durability.

Among the products which have been on the market, digital video D3 has a smooth magnetic layer and the number of black spots for this product is from 20 to 30, in contrast to the black spot number of from 5 to 15 (preferably from 8 to 14) which characterizes the present invention. If the number of diffraction dots (black spots is smaller than 5, the magnetic layer surface is so smooth that good running durability sometimes cannot be obtained although the electromagnetic characteristics are good. If the number of black spots is larger than 15, electromagnetic characteristics can sometimes be impaired although good running durability is obtained. When the number black spots is in the range of from 5 to 15 (preferably from 8 to 14) as in the present invention, good electromagnetic characteristics are obtained due to the smoothness of the magnetic layer (i.e., preferably $R_a$ is from 2.6 to 4.5 nm) and, at the same time, the recording medium can have improved running durability due to a proper number of minute protrusions which function as spike particles to lower the value (coefficient of friction).

The number of diffraction dots can be controlled within a specific range. It decreases as the calendering conditions are made more severe or as the average particle size of the abrasive agent and carbon black particles incorporated are reduced.

The magnetic recording medium of the present invention may have any layer constitution as long as the degree of the ferromagnetic metal particle protrusions present on the magnetic layer surface is within the range of from 5 to 15 in terms of the number of diffraction dots (black spots). That is, the magnetic recording medium may have a single-layer magnetic layer, or may have a multiple layered constitution composed of two or more layers, e.g. one having a lower nonmagnetic layer or a lower magnetic layer and an upper magnetic layer formed thereon. In the case of a single-layer constitution, it is important to sufficiently heighten dispersibility in the magnetic coating solution, to employ a finely powdered nonmagnetic particle or carbon black, and to retard the drying of the coating. In the case of a multiple layered constitution, the desired product can be obtained by reducing the size of the particles for use in the lower layer (i.e., the lower nonmagnetic or lower magnetic layer), e.g., ferromagnetic or nonmagnetic particles and carbon black, or by conducting calendering under conditions of a roll temperature of preferably 50 to 110° C., more preferably 70 to 100° C., a linear pressure of preferably 200 to 400 kg/cm, more preferably 250 to 350 kg/cm, and a speed of preferably 50 to 350 m/min, more preferably 80 to 300 m/min.

Especially preferred in the present invention is a layer constitution comprising a lower nonmagnetic layer and an upper magnetic layer formed thereon.

The diffraction dot-counting method for the present invention is explained below which uses high-energy electron diffraction.

A tape sample of 5 cm by 5 cm is irradiated with an electron beam from the direction corresponding to the head drive direction for the magnetic tape loaded in a VTR, and the resulting diffraction pattern for ferromagnetic particles present on the magnetic layer surface can be filmed and analyzed. Five such samples are thus examined, and the values therefor are averaged. For examination, a transmission type electron microscope equipped with a reflection electron beam diffractometer which is an attachment to the microscope can be used. The examination conditions include an accelerating voltage of 100 kV and an electron beam diameter of about 0.1 mm, and the electron beam is radiated just to the tape sample surface in incidence of the electron beam. The diffraction pattern is filmed. The number of diffraction dots is determined by counting the diffraction dots (black spots) observed in a 100° range on the semicircular diffraction line caused by diffraction on the (211) plane of $\alpha$-iron crystals.

Although the magnetic recording medium of the present invention may have a single-layer structure (i.e., comprising a single magnetic layer), it is basically composed of two layers (i.e., comprising a lower nonmagnetic layer or a lower magnetic layer and an upper magnetic layer) or may have three or more layers. An example of the structure composed of three or more layers is one having an upper magnetic layer composed of two or more magnetic layers. In this case, with respect to the relationship between the uppermost magnetic layer and the lower magnetic layer, techniques for ordinary magnetic recording media having two or more magnetic layers are applicable. For example, such applicable techniques include one in which the ferromagnetic particles employed in the uppermost magnetic layer have a higher coercive force, a shorter average length in the long axis, and a smaller crystallite size than those employed in the lower magnetic layer. The lower nonmagnetic layer may be composed of two or more nonmagnetic layers. It is, however, preferable that when the individual layers are broadly classified, the magnetic recording medium have a constitution composed of an upper magnetic layer and a lower nonmagnetic layer.

The smooth surface of the upper magnetic layer are ensured by improving the dispersibility of inorganic particles in the lower nonmagnetic layer to facilitate the control of the interface between the lower nonmagnetic layer and the upper magnetic layer to attain improved electromagnetic characteristics and good running durability. In order to form an upper magnetic layer (hereinafter often referred to simply as "magnetic layer" or "upper layer") having a dry thickness of 1 $\mu$m or less on a lower nonmagnetic layer (hereinafter often referred to simply as "nonmagnetic layer" or "lower layer") without causing coating defects, it is especially preferred in the present invention that nonmagnetic inorganic particles having an inorganic oxide-covered surface (layer) are used for the lower layer-forming coating solution, and that the upper layer be applied on the lower layer first formed on a nonmagnetic support, while the lower layer is still in a wet state.

Thus, the present invention can provide a magnetic recording medium which is less apt to have coating defects such as pinholes or streaks, is excellent in mass production suitability, has an extremely thin magnetic layer, and shows performances comparable to those of thin ferromagnetic metal films.

Preferred examples of the ferromagnetic metal particles for use in the magnetic layer of the present invention include ferromagnetic metal particles or ferromagnetic alloy particles containing Fe, Ni, or Co as the main component (75% or more). Besides such atoms, the ferromagnetic metal (or alloy) particles may contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pt, Nd, P, Co, Fin, Zn, Ni, St, and B.

Before being dispersed, the ferromagnetic metal particles may be treated with, for example, a dispersant, lubricant, surfactant, or antistatic agent which will be described later. Such treatments are described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014.

The ferromagnetic alloy particles may contain a small amount of a hydroxide or oxide. For obtaining the ferromagnetic alloy particles for use in the present invention, a known method may be used. Examples thereof include: a method in which reduction is conducted with a composite organic acid salt (consisting mainly of an oxalate) and a reducing gas such as hydrogen; a method comprising reducing iron oxide with a reducing gas such as hydrogen to obtain Fe or Fe—Co particles or the like; a method comprising the thermal decomposition of a metal carbonyl compound; a method in which reduction is conducted by adding a reducing agent such as sodium boron hydride, a hypophosphite, or hydrazine to an aqueous solution of a ferromagnetic metal; and a method comprising vaporizing a metal in a low-pressure inert gas to obtain fine particles.

The thus-obtained ferromagnetic alloy particles may be used after undergoing a known gradual oxidation treatment. This treatment can be conducted by any of the following: a method comprising immersing the particles in an organic solvent, followed by drying; a method comprising immersing the particles in an organic solvent and feeding an oxygen-containing gas to form an oxide film on the surfaces, followed by drying; and a method in which an oxide film is formed on the surfaces by controlling the partial pressures of oxygen gas and an inert gas, without using an organic solvent.

The ferromagnetic metal particles for use in the upper magnetic layer in the present invention generally has a specific surface area as determined by the BET method of 25 to 80 m$^2$/g, preferably 40 to 70 m$^2$/g. Specific surface areas of 25 m/g or less are undesirable because noise is increased, while specific surface areas of 80 m$^2$/g or more are undesirable in that good surface properties are difficult to obtain. The crystallite size of the ferromagnetic metal particles for use in the upper magnetic layer in the present invention is generally from 450 to 100 Å, preferably from 350 to 100 Å. The saturation magnetization ($\sigma_s$) of the ferromagnetic metal particles is preferably 100 emu/g or higher, more preferably from 110 to 170 emu/g. The coercive force thereof is preferably from 1,100 to 2,500 Oe, more preferably from 1,400 to 2,000 Oe. The aspect ratio of the ferromagnetic metal particles preferably 18 or lower, more preferably 12 or lower.

It is preferable that the water content of the ferromagnetic metal particles be regulated to 0.01 to 2%. It is preferred to optimize the water content of the ferromagnetic metal particles according to the kind of binder. The tap density (measured under the condition of number tapping: 150 and head: 30 mm using tap density measuring instrument manufactured by Seishin Enterprise Inc.) preferably from 0.2 to 0.8 g/ml. The tap density of higher than 0.8 g/ml are apt to result in acceleration of the oxidation of the ferromagnetic metal particles during compaction, so that a sufficient saturation magnetization ($\tau_s$) is difficult to obtain. If the tap density is less than 0.2 g/ml, insufficient dispersion is apt to result.

It is preferred that the pH of the ferromagnetic metal particles be optimized according to the combination with the binder to be used. Although the pH thereof may generally be in the range of from 4 to 12, it is preferably from 6 to 10. If necessary, the ferromagnetic metal particles may be surface-treated with Al, Si, P, or an oxide or other compound thereof; the amount of such treating agent is generally from 0.1 to 10% based on the ferromagnetic metal particles. This surface treatment is advantageous in that it reduces the adsorption of a lubricant, e.g., a fatty acid, to 100 mg/m$^2$ or less. Although in some cases the ferromagnetic metal particles contain a soluble inorganic ion such as Na, Ca, Fe, Ni, or Sr, this does not substantially affect the properties if the content is 500 ppm or less.

As the binder for use in the lower nonmagnetic layer and upper magnetic layer in the present invention a conventionally known thermoplastic resin, thermosetting resin, or reactive resin, or a mixture thereof may be used. The thermoplastic resin may be one having a glass transition temperature of $-100$ to $150°$ C., a number-average molecular weight of generally 1,000 to 200,000, preferably 10,000 to 100,000, and a polymerization degree of about 50 to 1,000. Examples of such thermoplastic resins include polymers or copolymers containing a structural unit derived from vinyl chloride, vinyl acetate, vinyl alcohol, maleic acid, acrylic acid, an acrylic ester, vinylidene chloride acrylonitrile, methacrylic acid, a methacrylic acid ester styrene, butadiene, ethylene, vinyl butyral, vinyl acetal, a vinyl ether, or the like; polyurethane resins; and various rubber-type resins. Examples of the thermosetting or reactive resin include phenolic resins, epoxy resins, thermosetting polyurethane resins, urea resins, melamine resins, alkyd resins, reactive acrylic resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate.

These resins are described in *Plastic Handbook*, published by Asakura Shoten, Japan.

It is also possible to use a known resin of the electron beam-hardening type for the lower layer or the upper layer. Examples of such resins and the production process therefor are described in detail in JP-A-62-256219.

The above-enumerated resins can be used alone or in combination. Preferred examples include combinations of a polyurethane resin with at least one member selected from the group consisting of vinyl chloride resins, vinyl chloride-vinyl acetate resins, vinyl chloride-vinyl acetate-vinyl alcohol resins, and vinyl chloride-vinyl acetate-maleic anhydride copolymers, and further include combinations of these with a polyisocyanate.

The polyurethane resins may have a known structure such as a polyester polyurethane, a polyether polyurethane, a polyether polyester polyurethane, a polycarbonate polyurethane, a polyester polycarbonate polyurethane, or a polycaprolactone polyurethane.

For obtaining further improved dispersibility and durability, it is preferred to use, if desired, one or more of the above-enumerated binders which have, incorporated therein through copolymerization or addition reaction, at least one polar group selected from the group consisting of —COOM, —SO$_3$M, —OSO$_3$M, —P=O(OM$_1$) (OM$_2$), —OP=O(OM$_1$) (OM$_2$), —NR$_4$X (wherein M, M$_1$, and M$_2$ each represents H, Li, Na, K, —NRL, or —NHR$_3$, R represents an alkyl group or H, and X represents a halogen atom), OH, NR$_2$, N+R$_3$ (R represents a hydrocarbon group), epoxy group, SH, CN, and the like. The amount of such polar group(s) is generally from $1\times10^{-1}$ to $1\times10^{-8}$ mol/g preferably from $1\times10^{-2}$ to $1\times10^{-6}$ mol/g.

Specific examples of those binders that can be used in the present invention include VAGH, VYHH, VMCHf VAGF, VAGD, VROH, VYES, VYNC, VMCC, XYHL, XYSG, PKHH, PKHJ PKHC, and PKFE (manufactured by Union Carbide Co., Ltd. Japan); MPR-TA, MPR-TA5, MPR-TAL, MPR-TSN, MPR-TMF, MPR-TS MPR-TM, and MPR-TAO (manufactured by Nisshin Chemical Industries Co., Ltd., Japan); 1000W, DX80, DX81, DX82, DX83, and 100FD (manufactured by The Electro Chemical industrial Co., Ltd., Japan); MR105, MR110, MR100, and 400 X110A (manufactured by Japanese Zeon Co., Ltd., Japan); Nippolan N2301, N2302, and N2304 (manufactured by Nippon Polyurethane Co., Ltd., Japan); Pandex T-5105, T-R3080, T-5201, Burnock D-400, D-210-80, Crisvon 6109, and 7209 (manufactured by Dainippon Ink & Chemicals, Inc., Japan; Vylon UR8200, UR8300, UR8600, UR5500, UR4300, RV530, and RV280 (manufactured by Toyobo Co., Ltd., Japan) Daipheramine 4020, 5020, 5100, 5300, 9020, 9022, and 7020 (manufactured by Dainichiseika Co., Ltd., Japan); MX5004 (manufactured by Mitsubishi Chemical Corporation, Japan; Sunprene SP-150 (manufactured by Sanyo Chemical Industries Co., Ltd., Japan); and Salan F310 and F210 (manufactured by Asahi Chemical Industry Co., Ltd., Japan).

The amount of the binder to be used in the magnetic layer in the present invention is generally in the range of from 5 to 50% by weight, preferably from 10 to 35% by weight, based on the ferromagnetic metal particles. In the case of employing a vinyl chloride resin, it is preferred to use it in an amount of 5 to 30% by weight. In the case of employing a polyurethane resin, it is preferred to use 2 to 20% by weight of a polyurethane resin and 2 to 20% by weight of a polyisocyanate in combination.

The amount of the binder to be used in the lower nonmagnetic layer in the present invention is generally in the range of from 5 to 50% by weight, preferably from 10 to 35% by weight, based on the total amount of nonmagnetic particles. When employing a vinyl chloride resin, it is preferred to use it in an amount of 3 to 30% by weight. When employing a polyurethane resin, it is preferred to use 3 to 30% by weight of a polyurethane resin and 0 to 20% by weight of a polyisocyanate in combination.

When using a polyurethane resin in the present invention, the resin is preferably one having a glass transition temperature of $-50$ to $100°$ C., an elongation at break of 100 to 2,000%, a stress at break of 0.05 to 10 kg/cm$^2$ and a yield point of 0.05 to 10 kg/cm$^2$.

If necessary, the lower layer and upper magnetic layer can, of course, be formed so as to differ in binder amount, the proportion of a vinyl chloride resin polyurethane resin, polyisocyanate, or other resin in the binder, the molecular weight of each resin contained in the magnetic layer, polar group amount, the above-mentioned physical properties of resin, etc.

Examples of the polyisocyanate for use in the present invention include isocyanates such as tolylene diisocyanate, 4,4'-diphenylmethane diisocyanate, hexamethylene diisocyanate, xylylene diisocyanate, naphthylene 1,5-diisocyanate, o-toluidine isocyanate, isophorone diisocyanate, and triphenylmethane triisocyanate; reaction products of the above-mentioned isocyanates with polyalcohols; and polyisocyanates formed through condensation of isocyanates. These isocyanates are commercially available under the trade names of: Coronate L, Coronate HL, Coronate 2030, Coronate 2031, Millionate MR, and Millionate MTL (manufactured by Nippon Polyurethane Co., Ltd., Japan); Takenate D-102, Takenate D-110N, Takenate D-200, and Takenate D-202 (manufactured by Takeda Chemical Industries, Ltd., Japan); and Desmodur L, Desmodur IL, Desmodur N, and Desmodur HL (manufactured by Sumitomo Bayer Co., Ltd., Japan). For each of the lower nonmagnetic layer and the upper magnetic layer, these polyisocyanates may be used alone, or in combination of two or more thereof, taking advantage of a difference in hardening reactivity.

The carbon black for use in the upper magnetic layer and lower nonmagnetic layer in the present invention may be, for example, furnace black for rubbers, thermal black for rubbers, coloring black, acetylene black, or the like. It is preferable that the carbon black have a specific surface area of 5 to 500 m$^2$/g, an oil absorption as measured with DBP of 10 to 400 $\mu$ml/100 g, a particle diameter of 5 to 300 $\mu$m, a pH of 2 to 10, a water content of 0.1 to 10%, and a tap density of 0.1 to 1 g/ml. Specific examples of carbon blacks usable in the present invention include BLACKPEARLS 2000, 1300, 1000, 900, 800, 700, and VULCAN XC-72 (manufactured by Cabot Co., Ltd.); #80, #60, #55, #50, and #35 (manufactured by Asahi Carbon Co., Ltd., Japan); #2400B, #2300, #900, #1000, #30, #40, and #10B (manufactured by Mitsubishi Chemical Corporation, Japan); and CONDUCTEX SC, RAVEN 150, 50, 40, and 15 (manufactured by Columbian Carbon Co., Ltd.).

These carbon blacks may be surface-treated with a dispersant or other agent or grafted with a resin before use. A carbon black whose surfaces have been partly graphitized may also be used. Further, before being added to a magnetic coating solution, the carbon black may be dispersed into a binder. These carbon blacks can be used alone or in combination. When using a carbon black, its amount is preferably from 0.1 to 30% by weight based on the ferromagnetic particles.

The carbon black incorporated in the magnetic layer functions as an antistatic agent of the magnetic layer, to reduce the coefficient of friction of the layer, as a light screen for the layer, and to improve the strength of the layer. Such effects are produced to different degrees depending on the kind of carbon black used. Therefore it is, of course, possible in the present invention to properly use carbon blacks according to the purpose so as to obtain an upper layer and a lower layer which differ in the kind, amount, and combination of carbon blacks, on the basis of the above-described properties including particle size, oil absorption, electrical conductivity, and pH. With respect to carbon blacks usable in the upper layer in the present invention, reference may be made to, for example, *Carbon Black Binran (Carbon Black Handbook)* (edited by Carbon Black Association, Japan).

As the abrasive agent for use in the upper magnetic layer in the present invention, known materials having a Mohs' hardness of 6 or more can be used alone in combination. Examples thereof include G-alumina having an $\alpha$-conversion of 90% or higher, $\beta$-alumina, silicon carbide, chromium oxide, cerium oxide, $\alpha$-iron oxide corundum, artificial diamond, silicon nitride, silicon carbide, titanium carbide, titanium oxide, silicon dioxide and boron nitride. A composite made up of two or more of these abrasive agents (e.g., one obtained by surface-treating one abrasive agent with another) may also be used. Although in some cases these abrasive agents contain compounds or elements other than the main component, the same effect is obtained with such abrasive agents as long as the content of the main component is 90% or higher.

It is preferable that these abrasive agents have particle sizes of 0.01 to 2 $\mu$m. If necessary, abrasive materials having different particle sizes may be used in combination, or a single abrasive agent having a widened particle diameter distribution may be used so as to produce the same effect. It is preferred that the abrasive agent have a tap density of 0.3 to 2 g/ml, a water content of to 5%, a pH of 2 to 11, and a specific surface area of 1 to 30 m/g. Although abrasive agents that can be used in the present invention may have any particle shape selected from acicular, spherical, and cubic forms, a particle shade having a sharp corner as part of the contour is preferred because abrasive agents of this shape have high abrasive properties.

Specific examples of abrasive materials that can be used in the present invention include AKP-20, AKP-30f AKP-50, HIT-50, and HIT-100 (manufactured by Sumitomo Chemical Co., Ltd., Japan); G5, G7, and S-1 (manufactured by Nippon Chemical Industrial Co., Ltd., Japan); and TF-100, TF-140, 100ED, and 140ED (manufactured by Toda Kogyo Corp., Japan). It is, of course, possible in the present invention to properly use abrasive agents according to the purpose so as to give an upper layer and a lower layer which differ in the kind, amount, and combination abrasive agents. These abrasive agents may be dispersed in a binder before being added to a magnetic coating solution.

The dispersibility of nonmagnetic particles to be incorporated in the lower nonmagnetic layer of the present invention can be improved by covering the surfaces of the particles with an inorganic oxide. Although the covering functions is not completely understood, it is presumed that the water (hydroxyl groups) present on the surfaces of the inorganic particles interacts with the solvent to affect the dispersibility of the particles.

The present inventor has succeeded in improving the dispersibility of the particles by controlling the water amount. In the present invention, the control water amount is attained by reacting the water present on the inorganic particle surfaces treated with an inorganic compound thereby to form on the surfaces a treated surface layer which is an inorganic oxide layer.

It is preferable that the nonmagnetic inorganic particles to be used in the present invention be regulated to have a water content of desirably 0.05 to 10% by weight, more desirably 0.1 to 8% by weight, at the time of coating solution preparation.

The structure of the inorganic oxide or its layer in the present invention is not particularly limited as long as it is made of an oxide or oxides of one or more elements. The inorganic oxide usually has a structure in which it has been polymerized through $H_2O$. It should be noted, however, that the individual inorganic oxides are present in different states on the nonmagnetic particles. For example, $Al_2O_3$ is present relatively uniformly on the $TiO_2$ surface, while $SiO_2$ is present in the granular state and aggregation state. Other inorganic oxides include $SnO_2$, $Sb_2O_3$ and $ZnO$.

A treated surface layer obtained by coprecipitation may be used according to the purpose. It is also possible to use a treated surface layer having a structure formed by first treating with alumina and then treating the resulting surface layer with silica, or to use a treated surface layer having a structure which is the reverse the above structure. Although the treated surface layer may be made porous if necessary, a homogeneous and dense surface layer is generally preferred.

It is preferable in the present invention that the nonmagnetic inorganic particles be covered, for example, with generally 1 to 21% by weight, preferably 2 to 18% by weight, of $Al_2O_3$; generally 0.04 to 20% by weight, preferably 0.1 to 18% by weight, of $SiO_2$; and generally 0.05 to 15% by weight, preferably 0.5 to 10% by weight, $ZrO_2$; as inorganic oxides, based on the total amount of the particles. The proportion of $Al_2O_3$ in the above inorganic oxides is preferably 50% by weight or higher.

Preferred examples of the inorganic particles be surface-treated include titanium dioxide, barium sulfate, zinc oxide, α-iron oxide, and goethite.

A preferred example of the nonmagnetic inorganic particles is nonmagnetic particles consisting mainly of futile-type titanium dioxide, with the content of the inorganic oxide being preferably from 5 to 30% by weight, especially preferably from 7 to 20% by weight.

For example, the surface treatment of nonmagnetic inorganic particles for forming a treated surface layer thereon may be conducted as follows. A material for the nonmagnetic inorganic particles is dry-ground, and water and a dispersant are then added thereto. The resulting slurry is subjected to wet grinding, followed by centrifugal separation to separate coarse particles. The resulting slurry of fine particles is then transferred to a surface-treatment tank to achieve surface-covering with a metal hydroxide. First, an aqueous solution of a predetermined amount of a salt of Al, Si, Ti, Zr, Sb, Sn, Zn, etc. is added to the slurry and then an acid or alkali is added to neutralize the resulting slurry, thereby to form a hydrous hydroxide and to cover the surfaces of the inorganic particles with the hydroxide. The water-soluble salts formed as by-products are removed by decantation, filtration, and washing. The slurry is subjected to final pH adjustment, filtration, and washing with pure water. The resulting cake is dried with a spray dryer or hand dryer. Finally, the dry particles are ground with a jet mill to give a product. In place of such a wet process, the surface treatment can be conducted by passing vapors of $AlCl_3$ and $SiCl_4$ through nonmagnetic inorganic particles and then passing water vapor to treat the particle surfaces with Al and Si.

With respect to other methods for the surface treatment, reference may be made to *Characterization of Powder Surfaces,* published by Academic Press.

In order to attain the desired surface properties of the magnetic layer, it is preferable that at least one of the following two requirements be satisfied in addition to the requirements essential to the present invention.

(1) The nonmagnetic particles contained in the lower nonmagnetic layer include inorganic particles having a Mohs' hardness of 3 or more, and the ferromagnetic metal particles contained in the upper magnetic layer are acicular ferromagnetic metal particles, and further the inorganic particles in the lower nonmagnetic layer have an average particle diameter which is from ½ to 4 times the crystallite size of the acicular ferromagnetic metal particles.

(2) The nonmagnetic particles contained in the lower nonmagnetic layer include inorganic particles having a Mohs' hardness of 3 or more, and the ferromagnetic metal particles contained in the upper magnetic layer are acicular ferromagnetic metal particles, and further the inorganic particles in the lower nonmagnetic layer have an average particle diameter which is not larger than ⅓ times the length in the long axis length of the acicular ferromagnetic metal particles.

The requirements (1) and (2) above are intended to ensure the surface properties of the lower nonmagnetic layer by restricting the sizes and shapes of both the ferromagnetic metal particles in the upper magnetic layer and the inorganic particles in the lower nonmagnetic layer. Further, the size of the inorganic particles enables the ferromagnetic metal particles to be oriented mechanically stably.

The volume packing density of inorganic particles in the lower layer is in the range of preferably from 20 to 60%, more preferably from 25 to 55%.

Additives having a lubricating effect, antistatic effect, dispersing effect, plasticizing effect, and the like may be used in the present invention. Examples of such additives include molybdenum disulfide, tungsten disulfide, graphite, boron nitride, graphite fluoride. silicone oils, silicones having a polar group, fatty acid-modified silicones, fluorine-containing silicones fluorine-containing alcohols, fluorine-containing esters, polyolefins, polyglycols, esters of alkylphosphoric acids and alkali metal salts of the acids, esters of alkylsulfuric acids and alkali metal salts of the acids. polyphenyl ethers, esters of fluorine-containing alkyl sulfuric acids and alkali metal salts of the acids monobasic fatty acids having 10 to 24 carbon atoms (which may have an unsaturated bond or be branched) and metal. (e.g., Li, Na, K, Cu, etc.) salts of the acids, mono-, di-, tri-, tetra-, penta-, and hexa-valent alcohols having 12 to 22 carbon atoms (which may have an unsaturated bond or be branched), alkoxyalcohols having 12 to 22 carbon atoms mono-, di-, or tri-fatty acid esters consisting of a monobasic fatty acid having 10 to 24 carbon atoms (which may have an unsaturated bond or be branched) and any one of a mono-, di-, tri-, tetra-, penta-, and hexa-valent alcohol having 2 to 12 carbon atoms (which may have an unsaturated bond or be branched), fatty acid esters of monoalkyl ethers of alkylene oxide polymers, fatty acid amides having 8 to 22 carbon atoms, and aliphatic amines having 8 to 22 carbon atoms. Specific examples of these compounds include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Surfactants also may be used. Examples thereof include nonionic surfactants such as the alkylene oxides, glycerines, glycidols, and alkylphenol ethylene oxide adducts; cationic surfactants such as cyclic amines, ester amides, quaternary ammonium salts, hydantoin derivatives, heterocyclic compounds, and phosphonium or sulfonim compounds; anionic surfactants including an acidic group such as a carboxylic acid, sulfonic acid, phosphoric acid sulfuric acid ester groups, or phosphoric acid ester groups; and ampholytic surfactants such as amino acids aminosulfonic acids, esters of sulfuric or phosphoric acid with amino-alcohols, and alkyl-betaines. These surfactant are described in detail in *Kaimen Kasseizai Binran* (*Surfactant Handbook*) (published by Sangyo Tosho K.K., Japan).

These additives, including lubricants and antistatic agents, are not necessarily 100% pure, and may contain impurities such as isomers, unreacted products, by-products, decomposition products, oxidation products, etc. besides the main components. The content of these impurities is preferably 30% or lower, more preferably 10% or lower.

In the present invention, these lubricants and surfactants can be properly used according to need so as to differ in kind and amount between the lower nonmagnetic layer and the upper magnetic layer. For example, fatty acids having different melting points are used for the lower nonmagnetic layer and the upper magnetic layer, respectively, to control migration to the surface. Esters different in boiling point or polarity are used to control elution to the surface. The surfactant amounts are regulated to improve the stability of coating. A larger lubricant amount is used for the lower nonmagnetic layer to improve lubricating effect. It is a matter of course that the manners of using lubricants or surfactants are not limited to these examples.

Part or all of the additives to be used in the present invention may be added at any step in the coating solution preparation process. For example, it is possible: to mix the additives with ferromagnetic metal particles prior to a kneading step; to add the additives during the kneading of ferromagnetic metal particles with a binder and a solvent; to add the additives at a dispersing step; to add the additives after dispersion; or to add the additives immediately before coating. Examples of marketed lubricants that can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor oil-hardened fatty acid. NAA-42, NAA-44, Cation SA, Cation MA, Cation AB, Cation BB Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-22, Nonion ST-221, Nonion OT-221, Monoguri MB, Nonion DS-60, Anon BF, Anon LG, butyl stearate, butyl laurate, and erucic acid (manufactured by Nippon Oils & Fats Co., Ltd., Japan; oleic acid (manufactured by Kanto Chemical Co., Ltd., Japan); FAL-205 and FAL-123 (manufactured by Takemoro Yushi Co., Ltd., Japan); Enujerubu LO, Enujerubu IPM, and Sansosyzer E4043 (manufactured by Shin Nihon Rika Co., Ltd., Japan); TA-3, KF-96, KF-96L, KF-96H, KF410, KF420, KF965, KF54, KF50, KF56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (manufactured by Shin-Etsu Chemical Co., Ltd., Japan); Armide P, Armide C, and Armoslip CP (manufactured by Lion Armer Co., Ltd.); Duomine TDO (manufactured by Lion Fat and Oil Co., Ltd., Japan); BA-41G manufactured by The Nisshin Oil Mills Co., Ltd., Japan); and Profan 2021E, New Pol PE61, Ionet MS-400, Ionet M0-200, Ionet DL-200, Ionet DS-300, Ionet DS-1000, and Ionet DO-200 (manufactured by Sanyo Chemical Industries, Ltd).

Examples of organic solvents that can be used in the present invention include ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclo-hexanol; esters such as methyl acetate, butyl acetate, isobutyl acetate, isopropyl acetate, ethyl lactate, and glycol acetate; glycol ethers such as glycol dimethyl ethers, glycol monoethyl ethers, and dioxane; aromatic hydrocarbons such as benzene, toluene, xylene, cresol, and chlorobenzene; chlorinated hydrocarbons such as methylene chloride, ethylene chloride, carbon tetrachloride chloroform, ethylene chlorohydrin, and dichlorobenzene; and other compounds such as N,N-dimethylformamide and hexane. These solvents may be used in arbitrary proportions.

These organic solvents need not be 100% pure, and may contain impurities such as isomers, unreacted raw materials, by-products, decomposition products, oxidation products, water, etc., besides the main components. The content of these impurities is preferably 30% by weight or lower, more preferably 10% by weight or lower. It is important that solvents having higher surface tensions (e.g., cyclohexanone and dioxane) should be used for the lower layer to enhance the stability of coating. Specifically, the arithmetic mean for the upper layer solvents should be not lower than that for the lower layer solvents.

The thickness of each constituent layer of the magnetic recording medium according to the present invention is as follows. The thickness of the nonmagnetic support is generally from 1 to 100 μm, preferably from 4 to 80 μm, the thickness of the lower layer is generally from 0.5 to 10 μm, preferably from 1 to 5 μm, and the thickness of the upper layer is generally from 0.05 to 1.0 μm, preferably from 0.05 to 0.6 μm, more preferably from 0.05 to 0.3 μm. The total thickness of the upper layer and lower layer is generally from 1/100 to 2 times the thickness of the nonmagnetic support.

An undercoating layer may be provided between the nonmagnetic support and the lower layer in order to improve adhesion. The thickness of this undercoating layer may be from 0.01 to 2 μm, preferably from 0.05 to 0.5 μm. Further, a back coating layer may be provided on the nonmagnetic support on the side opposite to the magnetic layer. The thickness of this back coating layer may be generally from 0.1 to 2 μm, preferably from 0.3 to 1.0 μm. Known layers can be used as the undercoating layer and back coating layer.

The nonmagnetic support for use in the present invention may be a known film. Examples thereof include films of polyesters such as poly(ethylene terephthalate and poly(ethylene naphthalate), polyolefins, cellulose triacetate, polycarbonates, polyamides, polyimides, poly(amide-imide)s, polysulfone, aramids, and aromatic polyamides. These supports may be previously subjected to corona discharge treatment, plasma treatment, adhesion-promoting treatment, heat treatment, dust-removing treatment, etc. In order to attain the object of the present invention, it is preferable to employ a support having a center-line average surface roughness $R_a$ (defined by JIS B 0601) of generally 0.03 μm or less, preferably 0.02 μm or less, more preferably 0.01 μm or less. In addition to the requirement of low center-line average surface roughness, the nonmagnetic supports are preferably free from protrusions as large as 1 μm or more. The state of the surface roughness of the support can be freely controlled by changing the size and amount of a filler which is incorporated into the support if necessary. Examples of the filler include oxides or carbonates of Ca, Si, and Ti and fine organic powders such as acrylic powder.

The process for preparing a magnetic coating solution to be used for producing the magnetic recording medium of the present invention comprises at least a kneading step and a dispersing step, and may further comprise a mixing step that may be conducted, if desired, before and after the two steps. Each step may include two or more stages. Each of the raw materials for use in the present invention, including ferromagnetic metal particles binders, carbon black, abrasive agents, antistatic agents, lubricants, and solvents, may be added in any step either at the beginning of or during the step.

Further, the individual raw materials may be added portion-wise in two or more steps. For example, a polyurethane may be added portion-wise in each of the kneading step, the dispersing step, and the mixing step for viscosity adjustment after the dispersion.

Conventionally known manufacturing techniques can, of course, be used as part of the process to attain the object of the present invention. However, use of a kneading machine having high kneading power, such as continuous kneader or pressure kneader, in the kneading step enables the magnetic recording medium of the present invention to have high Br, if desired. When using a continuous kneader or pressure kneader, the ferromagnetic metal particles are kneaded with all or part (preferably at least 30% by weight) of the binder, the binder amount being in the range of from 15 to 500 parts per 100 parts of the ferromagnetic particles. Details of this kneading treatment are given in JP-A-1-106338 and JP-A-64-79274. For preparing a coating solution for the lower nonmagnetic layer, use of a dispersion medium having a high specific gravity is desirable. Preferred examples thereof include zirconia beads and metal beads.

The magnetic recording medium of the present invention can be produced more efficiently by using the simultaneous multiple layered coating technique as described in JP-A-62-212933. As exemplary coating apparatuses and methods for producing multi-layered magnetic recording media such as that of the present invention, the following may be used.

1. A lower layer is first applied with a coating apparatus commonly used for magnetic coating solution application, e.g., a gravure coating, roll coating, blade coating, or extrusion coating apparatus, and an upper layer is then applied, while the lower layer is still in a wet state, by means of a support-pressing type extrusion coater such as those disclosed in JP-B-1-46186, JP-A-60-238179. and JP-A-2-265672.

2. An upper layer and a lower layer are applied almost simultaneously using a single coating head having therein two slits for passing coating solutions, such as those disclosed in JP-A-63-88080, JP-A-2-17921, and JP-A-2-265672.

3. An upper layer and a lower layer are applied almost simultaneously with an extrusion coater equipped with a back-up roll, such as that disclosed in JP-A-2-174965.

It is desirable that in order to prevent the electromagnetic characteristics and other properties of the magnetic recording medium from being impaired by aggregation of ferromagnetic particles, shearing be applied to the coating solution in the coating head by a method such as those disclosed in JP-A-62-95174 and JP-A-1-236968. The viscosity of each coating solution is preferably in the range as specified in JP-A-3-8471.

In the present invention, coating on nonmagnetic support is conducted by the so-called wet-on-wet coating method in which multiple layered coating .s performed while the lower layer-forming coating solution applied is still in a wet state.

The wet-on-wet coating methods for forming a lower layer and an upper layer in the present invention include so-called successive coating method in which one layer is applied first, and the other layer is then applied thereon as soon as possible while the first layer is still in a wet state, simultaneous coating method in which all the layers are applied simultaneously by extrusion coating, and other similar techniques.

As such a wet-on-wet coating technique, the coating method for preparing a magnetic recording medium as described in JP-A-61-139929 can be used.

For obtaining the recording medium of the present invention, it is necessary to conduct strong orientation. It is preferred to use a solenoid of 1,000 G (gauss) or more and a cobalt magnet of 2,000 G or more in combination and to conduct moderate drying prior to the orientation treatment so as to maximize orientation after drying. In the case where the present invention is applied to a disk-form recording medium, it is necessary to conduct the orientation treatment in such a manner as to randomize the orientation.

As calendering rolls, plastic rolls having heat resistance are used, such as epoxy, polyimide, polyamide or poly(imide-amide) rolls. Metal rolls alone can be used to conduct calendering. The calendering temperature is preferably from 50 to 110° C., more preferably from 70 to 100° C. The linear pressure is preferably from 200 to 400 kg/cm, more preferably from 250 to 350 kg/cm, and the calendering speed may be from 50 to 350 m/min.

The magnetic recording medium of the present invention preferably has the following properties: the coefficients of friction of the upper layer and the opposite side surface to stainless steel (i.e., SUS420J) are preferably 0.5 or less, more preferably 0.3 or less; the inherent surface resistivity of the magnetic layer preferably from $1\times10^4$ to $1\times10^{11}$ Ω/sq; the inherent surface resistivity of the lower layer is preferably from $1\times10^4$ to $1\times10^8$ Ω/sq when the lower layer alone is applied; and the surface electric resistance of the backing layer preferably from $1\times10^3$ to $1\times10^9$ Ω.

The present invention will be explained below more detail by reference to the following Examples and Comparative Examples. It will be apparent to one skilled in the art that various changes and modifications can be made of the ingredients, ingredient proportions, procedures, etc. shown below without departing from the spirit of the invention. Therefore, the present invention is not construed as being limited to the following Examples. In the Examples and Comparative Examples, all parts are by weight.

EXAMPLE 1

An upper magnetic layer-forming coating solution and a lower nonmagnetic layer-forming coating solution were prepared according to the following formulations.

| Lower Nonmagnetic Layer-Forming Coating Solution: | |
| --- | --- |
| Inorganic particles, $TiO_2$ | 80 parts |
| Average particle diameter | 0.035 μm |
| Crystal system | rutile |
| $TiO_2$ content | 90 wt % |
| Treated surface layer on the inorganic particles | $Al_2O_3$ (10 wt %) |
| BET specific surface area | 40 m²/g |
| DBP absorption | 27-38 g/100 g |
| pH | 7 |
| Carbon black | 20 parts |
| Average particle diameter | 16 mμ |
| DBP absorption | 80 ml/100 g |
| pH | 8.0 |
| BET specific surface area | 250 m²/g |
| Volatile content | 1.5% |
| Vinyl chloride-vinyl acetate-vinyl alcohol copolymer | 12 parts |
| Containing $5 \times 10^{-6}$ eq/g of the polar group, $-N(CH_3)_3{}^+Cl^-$ | |
| Monomer proportion | 86:13:1 |
| Polymerization degree | 400 |
| Polyester polyurethane resin | 5 parts |
| Neopentyl glycol/caprolactonepolyol/MDI = 0.9/2.6/1 | |
| Containing $1 \times 10^{-4}$ eq/g of $-SO_3Na$ group | |
| Butyl stearate | 1 part |
| Stearic acid | 1 part |
| Methyl ethyl ketone | 100 parts |
| Cyclohexanone | 50 parts |
| Toluene | 50 parts |
| Upper Magnetic Layer-Forming Coating Solution: | |
| Ferromagnetic metal particles | 100 parts |
| Composition, Fe/Zn/Ni = 92/4/4 | |
| $H_c$ | 1,600 Oe |
| BET specific surface area | 60 m²/g |
| Crystallite size | 195 Å |
| Average length in the long axis | 0.20 μm |
| Acicular ratio | 10 |
| Saturation magnetization ($\sigma_s$) | 130 emu/g |
| Surface-treating agent | $Al_2O_3$, $SiO_2$ |
| Vinyl chloride copolymer | 12 parts |
| Containing $1 \times 10^{-4}$ eq/g of $-SO_3Na$ group | |
| Polymerization degree | 300 |
| Polyester polyurethane resin | 3 parts |
| Neopentyl glycol/caprolactonepolyol/MDI = 0.9/2.6/1 | |
| Containing $1 \times 10^{-4}$ eq/g of $-SO_3Na$ group | |
| α-Alumina (average particle diameter, 0.3 μm) | 2 parts |
| Carbon black (average particle diameter, 0.10 μm) | 0.5 part |
| Butyl stearate | 1 part |
| Stearic acid | 2 parts |
| Methyl ethyl ketone | 90 parts |
| Cyclohexanone | 50 parts |
| Toluene | 60 parts |

With respect to each of the above coating solutions, the ingredients were kneaded with a continuous kneader and then dispersed with a sand mill. To each of the resulting dispersions was added a polyisocyanate in an amount of 1 part for the lower nonmagnetic layer-forming coating solution and in an amount of 3 parts for the upper magnetic layer-forming coating solution. To each dispersion, 40 parts of butyl acetate was added. The resulting dispersions were filtered with a filter having an average pore diameter of 1 μm, thereby to prepare a coating solution for forming a lower nonmagnetic layer and a coating solution for forming an upper magnetic layer.

The coating solutions thus-obtained were applied by a simultaneous multiple layered coating method as follows. The lower nonmagnetic layer-forming coating solution was applied at a dry thickness of 2.5 μm on a poly(ethylene terephthalate) support having a thickness of 7 μm and a center-line average surface roughness of 0.01 μm and, immediately thereafter, the upper magnetic layer-forming coating solution was applied thereon at a dry thickness of 0.5 μm. While the two layers were still in a wet state, orientation was conducted using a cobalt magnet having a magnetic force of 3,000 gauss and a solenoid having a magnetic force of 1,500 gauss. The resulting tape was dried, subsequently calendered at a temperature of 90° C., a pressure of 200 kg, and a speed of 150 m/min using a calender in which all the rolls were metal rolls arranged in a 7-stage, and then slit into a 8-mm width. Thus, a 8 mm video tape of Example 1 was produced.

COMPARATIVE EXAMPLE 1

The same procedures as in Example 1 were repeated except that the inorganic particles for the lower non-magnetic layer-forming coating solution were replaced with inorganic particles having no treated surface layer.

COMPARATIVE EXAMPLE 2

The same procedures as in Example 1 were repeated except that among the calendering conditions, the temperature and speed were changed to 80° C. and 80 m/min. respectively.

COMPARATIVE EXAMPLE 3

The same procedures as in Example 1 were repeated except that among the calendering conditions, the pressure and speed were changed to 300 kg/cm and 100 m/min, respectively.

EXAMPLE 2

The same procedures as in Example 1 were repeated except that the α-alumina for the upper magnetic layer-forming coating solution was replaced with one having an average particle diameter as small as 0.1 μm ("HIT-100", manufactured by Sumitomo Chemical Co., Ltd.), and that the calendering conditions of a temperature of 80° C., a pressure of 150 kg/cm, and a speed of 200 m/min were used.

EXAMPLE 3

The same procedures as in Example 1 were repeated except that the carbon black for the upper magnetic layer-forming coating fluid was replaced with one having an average particle diameter as small as 0.03 μm (Ketjen Black EC, manufactured by Lion Akzo Co., Ltd., Japan), and that calendering conditions of a temperature of 80° C., a pressure of 200 kg/cm, and a speed of 250 m/min were used.

The 8-mm video tapes thus-obtained were subjected to the following examinations to obtain evaluation results.

(1) Surface Roughness

Surface roughness was measured with non-contact surface roughness meter "3D-MIRAU", with which measurement is made based on light interference. The measurement was carried out using TOPO 3D (manufactured by WYKO Co., Ltd. by the MIRAU method at a wavelength of 650 nm, followed by spherical compensation and cylindrical compensation. Thus, the average surface roughness, R, was determined in an area of about 250×250 mm.

The $R_a$ values thus-obtained were in the range of from 2.5 to 6.5 nm.

(2) Reflection High-Energy Electron Diffraction

A video tape sample was irradiated with an electron beam from the direction corresponding to the head drive direction for the tape in a VTR, and the resulting diffraction pattern attributable to ferromagnetic metal particles present on the magnetic layer was filmed and analyzed. The primary conditions are shown below. Five tape samples of 5 cm by 5 cm were prepared.

Apparatus:
  transmission electron microscope ("HITACHI 12A", manufactured by Hitachi Ltd., Japan) equipped with a reflection electron beam diffractometer (HE-2), an attachment to the microscope Measurement Conditions:
  Accelerating voltage: 100 kV
  Electron beam diameter: about 0.1 mm
  Electron beam: the electron beam is radiated just to the tape sample surface incidence of the beam
  Diffraction pattern: filmed
Number of diffraction dots:
  The number was determined by counting the diffraction dots observed in a 100° range on the semicircular diffraction line caused by diffraction on the (211) plane of α-iron crystals.

(3) Electromagnetic Characteristics 1. 7 MHz Output: Using 8-mm video deck FUJIX8 (manufactured by Fuji Photo Film Co., Ltd.), 7 MHz signals were recorded. The recorded 7 MHz signals were reproduced and their output was measured with an oscilloscope. As a control, 8-mm tape SAG P6-120 (manufactured by Fuji Photo Film Co., Ltd.) was used.

2. C/N: Using 8-mm video deck FUJIX8 (manufactured by Fuji Photo Film Co., Ltd.), 7 MHz signals were recorded. The recorded signals were reproduced and the noises that generated at 6 MHz during the reproduction were measured with a spectrum analyzer. The ratio of the reproduced signals to the noises was determined.

(4) Running Durability

A tape sample was mounted into an 8-mm cassette and subjected repeatedly to 120-minute reproduction 100 times.

Evaluation was made based on the following.

G . . . No consecutive clogging of 5 μminutes or longer occurred.

B . . . Clogging occurred in the repeated 100 passes.

The evaluation results obtained are shown Table 1 below.

TABLE 1

| | Example 1 | Comparative Example 1 | Comparative Example 2 |
|---|---|---|---|
| Upper magnetic layer | | | |
| α-Alumina average particle diameter (μm) | 0.3 | 0.3 | 0.3 |
| Carbon black average particle diameter (μm) | 0.1 | 0.1 | 0.1 |
| Lower nonmagnetic layer | | | |
| Inorganic particle | surface-treated | no surface-treated | surface-treated |
| Calendering | | | |
| Temperature (°C.) | 90 | 90 | 80 |
| Pressure (kg/cm) | 200 | 200 | 200 |
| Speed (m/min) | 150 | 150 | 80 |
| Magnetic layer surface | | | |
| Roughness (nm) | 3.4 | 6.3 | 6.5 |
| Number of diffraction dots | 11.3 | 17.9 | 18.1 |
| Electromagnetic characteristics | | | |
| 7 MHz output (dB) | 6.1 | 2.5 | 2.3 |
| C/N (dB) | 5.9 | 2.1 | 2.0 |
| Running durability | G | G | G |

| | Comparative Example 3 | Example 2 | Example 3 |
|---|---|---|---|
| Upper magnetic layer | | | |
| α-Alumina average particle diameter (μm) | 0.3 | 0.1 | 0.3 |

TABLE 1-continued

| | | | |
|---|---|---|---|
| Carbon black average particle diameter (μm) | 0.1 | 0.1 | 0.03 |
| Lower nonmagnetic layer | | | |
| Inorganic particle | surface-treated | surface-treated | surface-treated |
| Calendering | | | |
| Temperature (°C.) | 90 | 80 | 80 |
| Pressure (kg/cm) | 300 | 150 | 200 |
| Speed (m/min) | 100 | 100 | 150 |
| Magnetic layer surface | | | |
| Roughness (nm) | 2.5 | 2.7 | 4.1 |
| Number of diffraction dots | 3.4 | 7.4 | 15.0 |
| Electromagnetic characteristics | | | |
| 7 MHz output (dB) | 7.3 | 6.3 | 5.2 |
| C/N (dB) | 6.4 | 6.1 | 4.9 |
| Running durability | B | G | G |

As apparent from the result of Table 1, the recording media of the Examples 1, 2 and 3 had small average surface roughnesses and large diffraction dot numbers and showed high electromagnetic characteristics and good running durability. Comparative Example 1 had a large average surface roughness because of the poor dispersibility of the inorganic particles having no treated surface layer and, hence, showed poor electromagnetic characteristics. Comparative Example 2, which had undergone weak calendering, had a large average surface roughness and showed poor electromagnetic characteristics. Comparative Example 3, which had undergone strong calendering (i calendering at high temperature and pressure), showed poor running durability, although it had a small average surface roughness and excellent electromagnetic characteristics. This may be because the magnetic layer surface had a small number of minute protrusions constituted by magnetic particles, as apparent from the small diffraction number, and hence its head-cleaning power was insufficient.

Thus, in order for a magnetic layer to have extremely smooth surface and good running durability, the number of diffraction dots as determined by RHEED is controlled to from 5 to 15.

According to the present invention, both electromagnetic characteristics, specifically 7 MHz output and C/N, and running durability can be improved simultaneously by regulating the magnetic layer to obtain from 5 to 15 diffraction dots attributable to ferromagnetic metal particles present on the magnetic layer surface when analyzed by reflection high-energy electron diffraction, the diffraction dots being counted in a 100° range on a circular arc of diffraction dots caused by diffraction on the (211) plane.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a lower nonmagnetic layer comprising nonmagnetic particles dispersed in a binder, and further having on the lower layer an upper magnetic layer comprising ferromagnetic metal particles comprising α-iron crystals dispersed in a binder, wherein said upper magnetic layer has diffraction dots attributable to the ferromagnetic metal particles present on the magnetic layer surface when analyzed by reflection high-energy electron diffraction, the number of said diffraction dots is from 5 to 15 when counted in a 100° range on a circular arc of diffraction dots caused by diffraction on a (211) plane of α-iron crystals of said ferromagnetic metal particles present on the magnetic layer surface.

2. The magnetic recording medium as in claim 1, wherein said upper magnetic layer contains an abrasive agent having an average particle size of from 0.05 to 0.3 μm and a carbon black having an average primary particle size from 0.005 to 0.1 μm.

3. The magnetic recording medium as in claim 1, wherein said lower nonmagnetic layer applied on the nonmagnetic support contains surface-treated nonmagnetic articles, said upper magnetic layer is formed while lower nonmagnetic layer is still in a wet state, and then the resulting magnetic recording medium is subjected calendering at a roll temperature of from 50 to 110° C., a linear pressure of from 200 to 400 kg/cm, and a speed from 50 to 350 m/min.

* * * * *